United States Patent [19]

David

[11] 4,356,630
[45] Nov. 2, 1982

[54] CABLE SLITTING TOOL

[76] Inventor: Ray T. David, 6806 Kildare Dr., Cincinnati, Ohio 45238

[21] Appl. No.: 261,253

[22] Filed: May 6, 1981

[51] Int. Cl.³ ............................................. B21F 13/00
[52] U.S. Cl. ........................................ 30/90.4; 30/90.6
[58] Field of Search ....................... 30/90.4, 90.6, 90.7

[56] References Cited

U.S. PATENT DOCUMENTS

| | | | |
|---|---|---|---|
| 2,235,342 | 3/1941 | Turner | 30/90.4 |
| 2,356,328 | 8/1944 | Lindgren | 30/90.7 |
| 2,621,659 | 12/1952 | Greene | 30/90.4 |
| 2,731,970 | 1/1956 | Hughes | 30/90.4 |
| 3,092,906 | 6/1963 | Deering | 30/90.6 |
| 4,133,109 | 1/1979 | Dow | 30/90.4 |
| 4,265,016 | 5/1981 | Ducret | 30/90.4 |

FOREIGN PATENT DOCUMENTS 895442  5/1962  United Kingdom ................ 30/90.4

Primary Examiner—Stephen G. Kunin
Assistant Examiner—J. T. Zatarga
Attorney, Agent, or Firm—James W. Pearce; Roy F. Schaeperklaus

[57] ABSTRACT

A tool for slitting a casing of a cable. A knife blade is held between a pair of holder halves. Slots in the holder halves along a part line form an opening between the holder halves of a size to receive the cable for movement axially through the opening. A corner portion of the knife blade extends from an edge of the opening transversely of the opening a sufficient distance to slit the casing of the cable without penetrating conductors of the cable as the cable is advanced along the opening.

3 Claims, 10 Drawing Figures

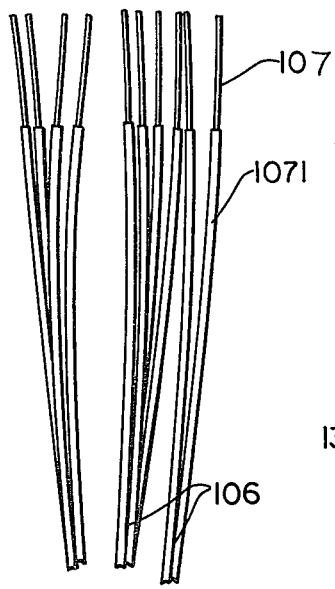
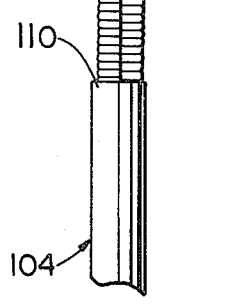
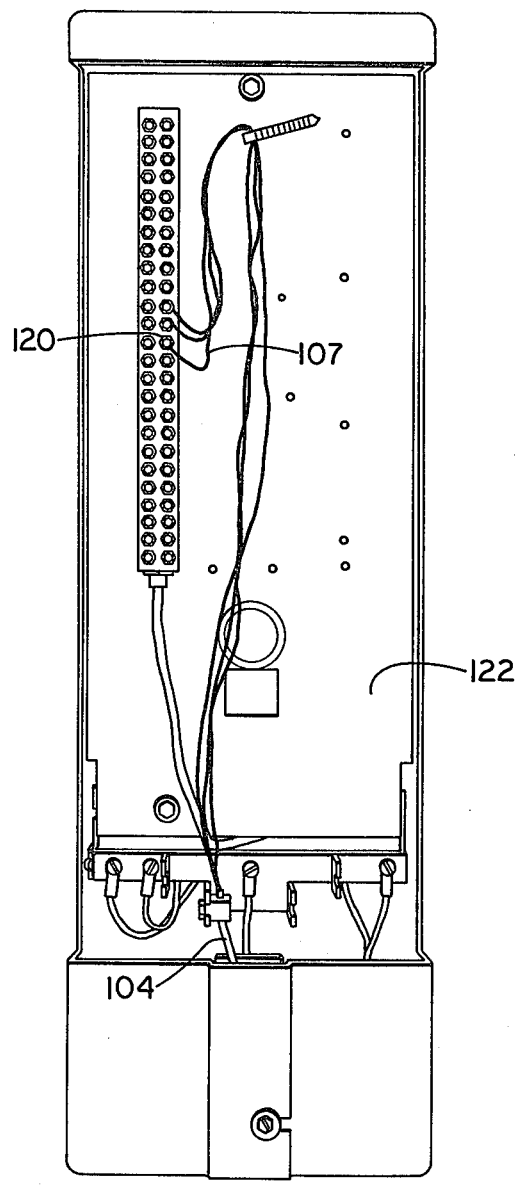
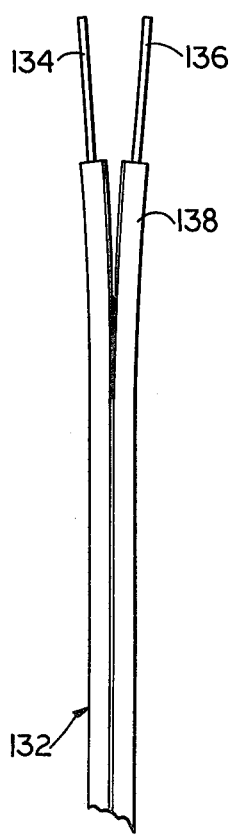
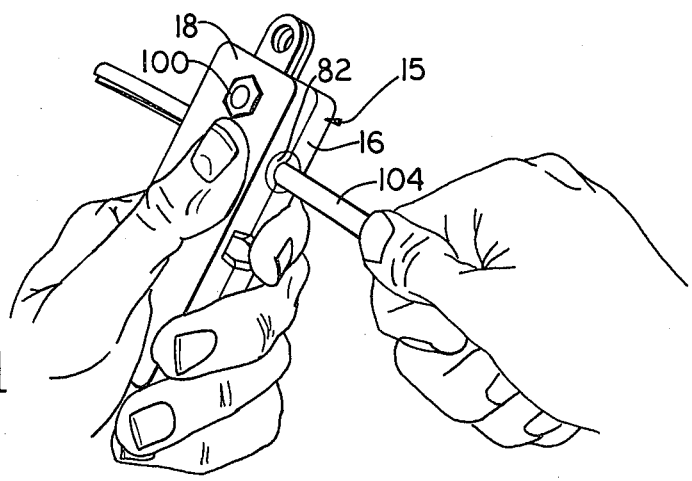

CABLE SLITTING TOOL

This invention relates to a device for slitting a casing of a cable.

An object of this invention is to provide a device which can slit a casing of a cable and armor inside the casing to a selected depth without interfering with insulated conductors of the cable.

A further object of this invention is to provide such a device in which a single knife can be used to slit a casing and armor of a cable to a selected depth and also to separate two conductors of a cable.

Briefly, this invention provides a cable slitting tool which includes a knife blade and two holder halves. The knife blade is mounted between the holder halves. Slot sections are formed in the holder halves along a part plane to form slots between the holder halves. A corner portion of the knife blade extends into one of the slots in position to engage and slit a sheath and an armor portion of a cable as the cable is advanced through the slot. Another portion of the knife blade extends diametrically across another of the slots in position to slice the cable along a diameter thereof.

The above and other objects and features of the invention will be apparent to those skilled in the art to which this invention pertains from the following detailed description and the drawings, in which:

FIG. 1 is a perspective view of a cable slitting tool constructed in accordance with an embodiment of this invention, a portion of a cable being shown in association therewith;

FIG. 2 is a view in side elevation of a multi-conductor cable as slit by the cable slitting tool;

FIG. 3 is a view in side elevation of a telephone connection box showing mounting of conductors of the multi-conductor cable;

FIG. 4 is a view in side elevation of a two-conductor cable as split by the tool;

In the following detailed description and the drawings, like reference characters indicate like parts.

In FIGS. 1 and 5-10 inclusive is shown a casing slitting tool 15 constructed in accordance with an embodiment of this invention. The tool 15 includes holder halves 16 and 18 and a knife blade 20.

Figure 10:
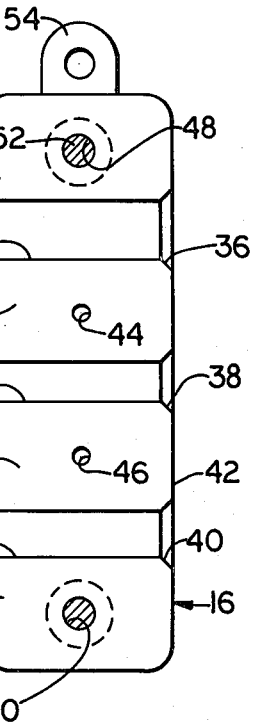
FIG. 10 is a view in section taken on the line 10—10 in FIG. 7.

The holder half 16 (FIG. 10) is a unitary member including co-planar lands 22, 24, 26 and 28 which are separated by slot sections 30, 32 and 34. The slot sections are parallel and extend crosswise of the holder half 16. The slot sections 30 and 34 are generally of half round cross-section while the slot section 32 is generally trapezoidal in cross section. End portions 36, 38 and 40 of the slot sections 30, 32 and 34, respectively, at a face 42 of the holder half 16 are countersunk as shown in FIG. 10. Aligning sockets 44 and 46 are formed in the lands 24 and 26, respectively. Fastener bores 48 and 50 are formed perpendicularly to the lands 22 and 28, respectively. The bores 48 and 50 are countersunk to receive head portions of fasteners 52. A grommet portion 54 extends from one end of the holder half 16.

Figure 5:
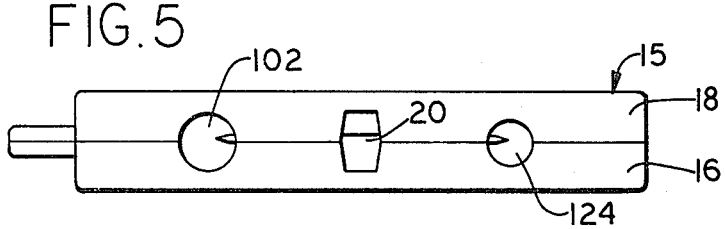
FIG. 5 is a view in side elevation of the cable slitting tool.
Figure 6:
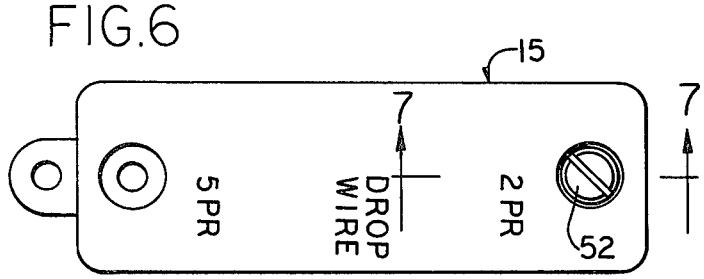
FIG. 6 is a view in front elevation of the cable slitting tool, one fastener thereof being removed.
Figure 7:
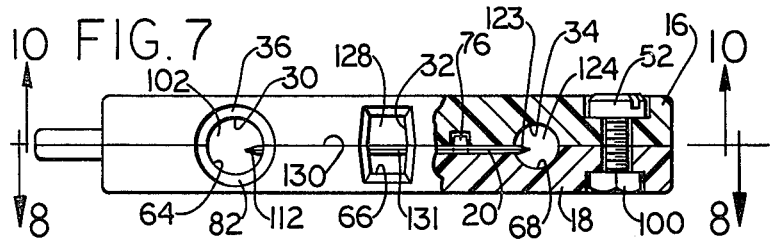
FIG. 7 is a view partly in side elevation and partly in section taken on the line 7—7 in FIG. 6.
Figure 8:
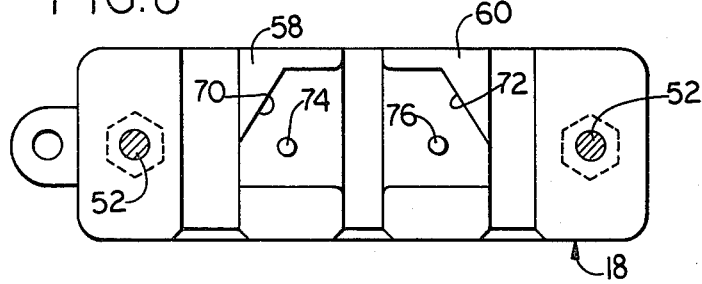
FIG. 8 is a view in section taken on the line 8—8 in FIG. 7 with the knife removed.
Figure 9:
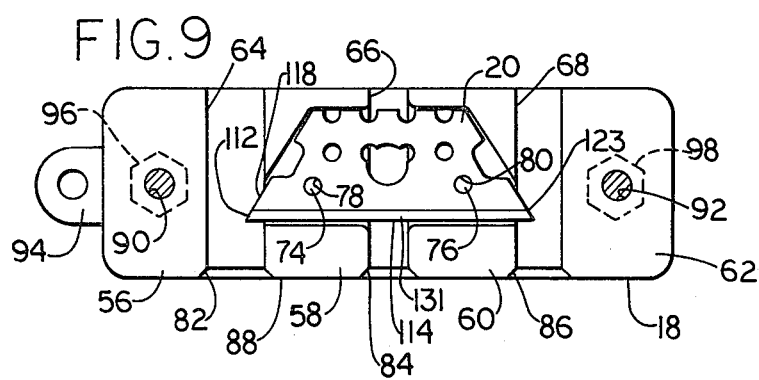
FIG. 9 is a view in section taken on the same line as FIG. 8 but with the knife shown in position.

The holder half 18 is a unitary member generally similar to the other holder half. The holder half 18 includes co-planar lands 56, 58, 60 and 62, which are separated by slot sections 64, 66 and 68. The slot sections 64, 66 and 68 are parallel and extend crosswise of the holder half 18. Sockets 70 and 72 are formed in the lands 58 and 60, respectively, for receiving the knife blade 20. Alignment pin portions 74 and 76 are formed in the sockets 70 and 72, respectively, and extend through bores 78 and 80, respectively, in the knife blade 20. The slot sections 64 and 68 are generally half round in cross section and are complementary to the slot sections 30 and 34, respectively. The slot section 66 is generally trapezoidal in cross section. End portions 82, 84 and 86 of the slot sections 64, 66 and 68, respectively, at a face 88 of the holder half 18 are countersunk as shown in FIGS. 7 and 9. Fastener bores 90 and 92 are formed perpendicularly to the lands 56 and 62, respectively. A grommet portion 94 extends from one end of the holder half 18. The pin portions 74 and 76 can be received in the aligning sockets 44 and 46, respectively, to align the holder halves. The knife blade 20 is held between the holder halves. Hexagonal sockets 96 and 98 in the holder half 18 receive nuts 100 that are mounted on the fasteners 52.

As shown in FIG. 7, the slot sections 30 and 64 form an opening 102 between the holder halves 16 and 18. The opening 102 can be of a size to receive a cable 104 (FIG. 2) having a number of pairs 106 of conductors 107. The cable 104 includes armor 108 surrounding the pairs of conductors and a casing 110 surronding the armor 108. A corner portion 112 of the knife blade 20 extends into the opening 102 with a sharp or cutting edge 114 of the knife blade 20 extending radially of the opening 102 so that, as the cable 104 is advanced into the opening 102 through the countersunk end portions of the slot sections, as shown in FIG. 1, the knife blade 20 can slit the casing 110 and the armor 108 of the cable 104. When the casing 110 and the armor 108 have been slit, the cable 104 can be withdrawn from the tool 15. An edge 118 of the knife blade 20 slopes into the opening 102 and toward the cutting edge 114 at an acute angle to the cutting edge 114 of about 56 degrees so that, as the cable 104 is withdrawn, the cable is urged across the opening 102 and away from the knife blade 20. When the cable has been removed from the tool 15, unwanted portions of the armor and of the casing can be removed so that end portions of the conductor pairs are exposed as shown in FIG. 2. The conductors of the conductor pairs can be attached to appropriate contacts 120 in a contact box 122.

The slot sections 34 and 68 combine to form an opening 124 between the holder halves of a size to receive a smaller cable (not shown), which includes a smaller number of pairs of conductors. A corner portion 124 of the knife blade 20 extends into the opening 124 and can slit armor and a casing of the smaller cable.

The corner portions 112 and 123 of the knife blade 20 extend sufficiently into the associated openings 102 and 124, respectively, to cut armor and casing but without cutting the conductors 107 of the pairs or insulation 1071 directly associated with each conductor 107.

The trapezoidal slot sections 32 and 66 cooperate to form an opening 128 between the holder halves 16 and 18, which is generally rectangular but bulges outwardly along a part line 130 between the holder halves 16 and 18 at which the lands of the holder halves meet. A central portion 131 of the cutting edge of the knife blade 20 extends across the opening 128 adjacent the part line 130. A cable 132 having two conductors 134 and 136 can be advanced along the opening 128 to cause separation of the conductors 134 and 136 with portions of insulation 138 of the cable 132 surrounding each of the conductors 134 and 136 as shown in FIG. 4.

The cable slitting tool illustrated in the drawings and described above is subject to structural modification without departing from the spirit and scope of the appended claims.

Having described my invention, what I claim as new and desire to secure by Letters Patent is:

1. A tool for slitting a casing of a cable which comprises a pair of holder halves, there being slots in the holder halves along a part line between the holder halves, the slots forming an opening between the holder halves of a size to receive the cable for movement axially through the opening, a knife blade having a cutting edge and mounted between the holder halves with a corner portion of the knife blade at one end of the cutting edge extending from an edge of the opening transversely of the opening a sufficient distance to slit the casing of the cable without penetrating conductors of the cable as the cable is advanced along the opening in a slitting direction, a second edge of the knife blade extending from said corner portion at an angle to the cutting edge; said second edge being engageable with the cable to urge the cable against a side of the opening away from the knife blade as the cable is advanced through the opening in a direction opposite to the slitting direction after the casing has been slit and means for holding the holder halves and the knife blade in assembled relation.

2. A tool as in claim 1 in which the opening is substantially circular in cross section and the knife blade includes a cutting edge which extends substantially radially of the opening.

3. A tool for slitting a casing of a first cable and for separating conductors of a second cable which comprises a pair of holder halves, there being first slots and second slots in the holder halves along a part line between the holder halves, the first slots forming a first opening between the holder halves of a size to receive the first cable for movement axially through the first opening, the second slots forming a second opening between the holder halves of a size to receive the second cable for movement axially through the second opening, a knife blade having a cutting edge and mounted between the holder halves with a corner portion of the knife blade at one end of the cutting edge extending from an edge of the first opening transversely of the first opening a sufficient distance to slit the casing of the first cable without penetrating conductors of the first cable as the first cable is advanced along the first opening in a slitting direction, a second edge of the knife blade extending from said corner at an angle to the cutting edge, said second edge being engageable with the first cable to urge the first cable against a side of the first opening away from the knife blade as the first cable is advanced through the first opening in a direction opposite to the slitting direction after the casing has been slit, another portion of the knife blade extending crosswise of the second opening for slicing insulation of the second cable as the second cable is advanced along the second opening to separate conductors of the second cable, and means for holding the holder halves and the knife blade in assembled relation.

* * * * *